(12) United States Patent
Huehsam

(10) Patent No.: US 7,572,488 B2
(45) Date of Patent: Aug. 11, 2009

(54) METHOD FOR APPLYING AN ELECTRICAL INSULATION

(75) Inventor: Andreas Huehsam, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 67 days.

(21) Appl. No.: 10/565,562

(22) PCT Filed: May 15, 2004

(86) PCT No.: PCT/DE2004/001023

§ 371 (c)(1), (2), (4) Date: Jan. 23, 2006

(87) PCT Pub. No.: WO2005/011091

PCT Pub. Date: Feb. 3, 2005

(65) Prior Publication Data

US 2006/0177593 A1   Aug. 10, 2006

(30) Foreign Application Priority Data

Jul. 22, 2003   (DE) ................. 103 33 187

(51) Int. Cl.
*B05D 1/04* (2006.01)
(52) U.S. Cl. .................................... 427/475
(58) Field of Classification Search ............ None
See application file for complete search history.

(56) References Cited

U.S. PATENT DOCUMENTS

| | | | |
|---|---|---|---|
| 3,470,010 A | 9/1969 | Christiansen | |
| 3,572,290 A | 3/1971 | Christiansen | |
| 5,316,801 A * | 5/1994 | Hopeck | 427/486 |
| 5,319,002 A * | 6/1994 | Matsuzaki et al. | 523/221 |
| 5,540,776 A * | 7/1996 | Habsburg-Lothringen | 118/634 |
| 5,618,589 A | 4/1997 | McFarland | |
| 5,741,558 A * | 4/1998 | Otani et al. | 427/469 |
| 5,922,413 A | 7/1999 | Takeda | |
| 6,032,871 A | 3/2000 | Borner et al. | |
| 6,322,629 B1 | 11/2001 | Okada et al. | |
| 2002/0078883 A1 | 6/2002 | Shutic et al. | |

FOREIGN PATENT DOCUMENTS

| | | |
|---|---|---|
| DE | 195 42 683 A1 | 5/1997 |
| DE | 197 55 652 A1 | 3/2000 |
| EP | 0 697 255 A2 | 2/1996 |
| EP | 0 891 817 A2 | 1/1999 |
| GB | 1046086 | 10/1966 |
| JP | 10-145994 | 5/1998 |
| JP | 10-314658 | 12/1998 |
| JP | 2001-170551 | 6/2001 |
| WO | WO 97/07585 A2 | 2/1997 |

OTHER PUBLICATIONS

Powder Coating The Complete Finishers Handbook, ed. by N.P. Liberto, 1994, pp. 82-85.*

* cited by examiner

*Primary Examiner*—Frederick J Parker
(74) *Attorney, Agent, or Firm*—Ronald E. Greigg

(57) ABSTRACT

In a method for applying an electrical insulation to a ferromagnetic body, provided with axial slots for receiving an electrical winding, of a primary element of an electrical machine, particularly to a slotted armature body of an armature of a direct-current motor, the body is coated with electrostatically charged plastic powder. For improving the economy of the method with a view to low system costs and great ease of maintenance while assuring reliable slot insulation, the coating is done with a high layer thickness by direct powder spraying onto the grounded body.

15 Claims, 3 Drawing Sheets

METHOD FOR APPLYING AN ELECTRICAL INSULATION

CROSS-REFERENCE TO RELATED APPLICATIONS

This application is a 35 USC 371 application of PCT/DE 2004/001023 filed on May 15, 2004.

BACKGROUND OF THE INVENTION

1. Field of the Invention

The invention is directed to an improved method for applying an electrical insulation to a ferromagnetic body, provided with axial slots for receiving an electrical winding, of a primary element of an electrical machine a slotted armature body of an armature of a direct-current motor.

2. Description of the Prior Art

A slotted armature body of an armature of a direct-current motor of the type with which this invention is concerned includes a plurality of profiled laminations, which are lined up axially one after the other and joined to make a lamination packet which is press-fitted onto an armature shaft. The armature body has a plurality of axial slots, which are open to both face ends of the cylindrical armature body 10 and which discharge at a slot opening in the cylindrical surface of the armature body. An armature winding in the form of coils is wound into the axial slots. The coils are wound from an insulated coil wire, such as painted copper wire. Before the armature winding is wound in place, the axial slots and also the face ends of the armature body are provided with an electrical insulation.

In the possible methods for applying such an insulation to the slots, coating the armature body with electrostatically charged plastic powder has proven itself as the most economical method, with the additional advantage that the slot cross section is reduced only insignificantly by the insulation, and a quite high slot fill factor for the armature winding can thus be achieved.

In a known method for applying the electrical insulation to the armature body by means of electrostatic powder coating, the armature body already pressed together with the armature shaft is precleaned to eliminate contamination occurring in manufacture; masked at points that are not to be coated, such as the armature shaft; and coated in a powder fluid bath with electrostatically charged plastic powder. The masks additionally take on a clamping function for fixing the armature body on a conveyor system that passes through the fluid bath, and for this purpose the armature bodies have to be repositioned on the conveyor system after masking. The bottom of the fluid bath comprises a porous plate, through which ionized or in other words electrically charged compressed air flows, which electrostatically charges the powder uniformly and fluidizes the powder, so that the powder behaves like a fluid. The electrostatically charged powder particles, because of the charges that are opposite the force of attraction, settle on the armature bodies being guided through the fluid bath and remain stuck to them. The thus-coated armature bodies are cleaned outside the fluid bath in a further method step, to remove powder adhering to the cylindrical surface of the armature bodies. Next, the cleaned armature bodies are delivered to a heating section, in which by heat input, the powder layer is melted and fired and hardened. The armature bodies are repositioned again and unmasked in a further method step. The unmasked armature bodies are then cooled down in a cooling zone. The removed masks are delivered to a mask cleaner, and with the cleaned masks, new, precleaned armature bodies are masked. The cooled-down armature bodies are removed from the processing system and delivered to an automatic winder.

This method produces a thin insulation layer, approximately 50 to 100 μm thick, in the axial slots with good thermal and electrical properties, but has decisive disadvantages in terms of costs. For instance, the fluid bath requires a horizontal position of the armature bodies, which in the rest of the production process are usually processed vertically, so that as the method progresses, the armature bodies have to be repositioned multiple times. Moreover, a quite complicated conveyor system is required for feeding the armature bodies through the fluid bath. If damage occurs in the fluid bath, replacing the fluid bath that is integrated into the system is extremely time-consuming and leads to expensive system down times. The masks also take on the function of clamping the armature bodies while they are being conveyed. If the masks become worn, inadequate clamping of the armature bodies can occur, which threatens the course of the process and leads to down times.

SUMMARY OF THE INVENTION

The method of the invention has the advantage that it can be implemented much more economically than the known methods and assures effective powder coating with reliable slot insulation. The components required for performing the method are standard components conventionally available on the market, of the kind used for instance in painting automobiles or in other painting systems for decorative surfaces and are available worldwide. These standard components require only little investment expense and are easy to maintain, so that functional parts can be quickly replaced and down times for maintenance and repair are reduced to a minimum. In the event of malfunctions or an inadequate throughput of material, the powder stream can immediately shut down, and thus the use of powder can be optimized.

The method of the invention thus takes on all the advantages of electrostatic powder spray-coating for decorative surfaces and, unlike that method, also assures reliably insulated coating of the slot walls with plastic powder. The application of a high layer thickness assures that a sufficiently thick powder layer will become deposited on the slot walls; this layer is as a rule thinner than the powder layer on the cylindrical surface of the body, yet it offers reliable insulating lining of the slots. The high layer thickness applied is greater by a factor 10 to 50 than the layer thicknesses that are achieved in powder coating of decorative surfaces and is in the range of approximately 1 to 1.5 mm. In electrostatic powder spraying, the axial slots are so-called Faraday cages, which are field-free, since the field lines of the magnetic field that develops between the spray source and the preferably grounded body, along which lines the electrically charged powder particles move, are concentrated at tips and protrusions and do not penetrate into the axial slots. Because of the so-called Faraday cage effect, that is, the fact that the field lines also extend to the face ends of the armature body, powder particles, while being electrostatically deposited at the ends of the slots, are not deposited in the slot interior. By the application of what according to the invention is a high layer thickness, the deposition of powder does occur first at points with high field line concentration at the beginning of the coating process. However, as spraying continues, saturation at these points ensues. The saturated points can no longer be coated, since a charge concentration occurs there. The powder particles that continue to arrive carry the same charge and are spun away from the body by electrostatic repulsion (back-spray effect). Since the spray source is electrically identically charged, however, the particles are not speeded up backward but instead are no longer subject to any external force from the field lines and penetrate into the interior of the axial slots.

Another advantage of the method of the invention is the improvement in handling the bodies in the production process, since unlike the known method that uses a fluid bath, the bodies can be sprayed in an arbitrary position and need not necessarily be put into a horizontal position. This dispenses with repositioning of the bodies, and thus further auxiliary stations in the course of the method can be dispensed with.

BRIEF DESCRIPTION OF THE DRAWINGS

The invention is described in further detail below, with reference to the drawings, in which.

DESCRIPTION OF THE PREFERRED EMBODIMENT

Figure 1:
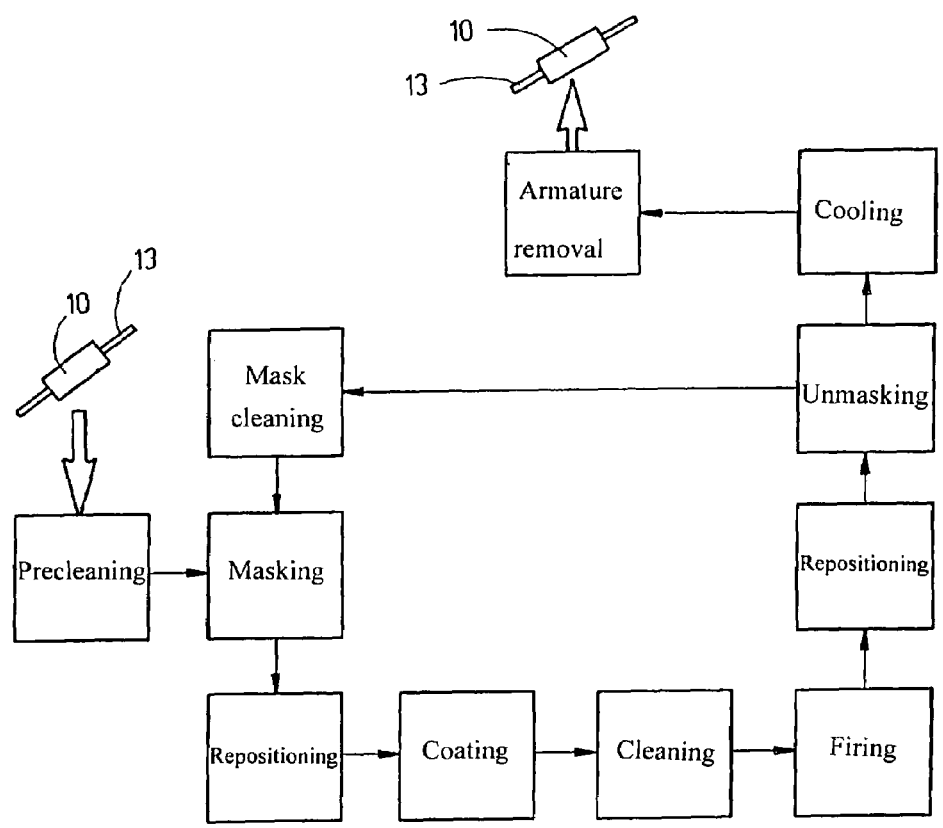
FIG. 1 is a flow chart of a method for applying an insulation to armature bodies for electrical machines in the prior art.
Figure 2:
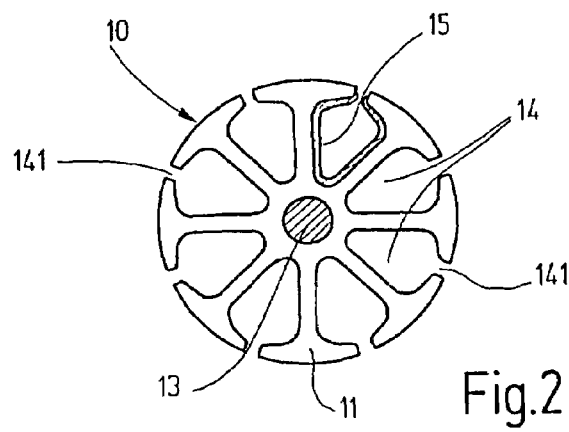
FIG. 2 is a cross section through an armature body pressed onto an armature shaft.

The method for applying an electrical insulation to a ferromagnetic body, provided with axial slots for receiving an electrical winding, of a primary element or in other words a stator or a rotor of an electrical machine will be described in terms of a slotted armature body 10 of an armature of a direct-current motor. The armature body 10, which can be seen end-on in FIG. 2, comprises a plurality of profiled laminations 11, which are lined up one after the other to form a so-called lamination packet and are axially joined firmly together. Instead of a profiled lamination packet, the armature body 10 may be embodied as a solid cylinder of soft magnetic composite material, or SMC material. The armature body 10 is provided in a known manner with a plurality of axial slots 14, located equidistantly over the circumference of the body, for receiving an armature winding.

Figure 3:
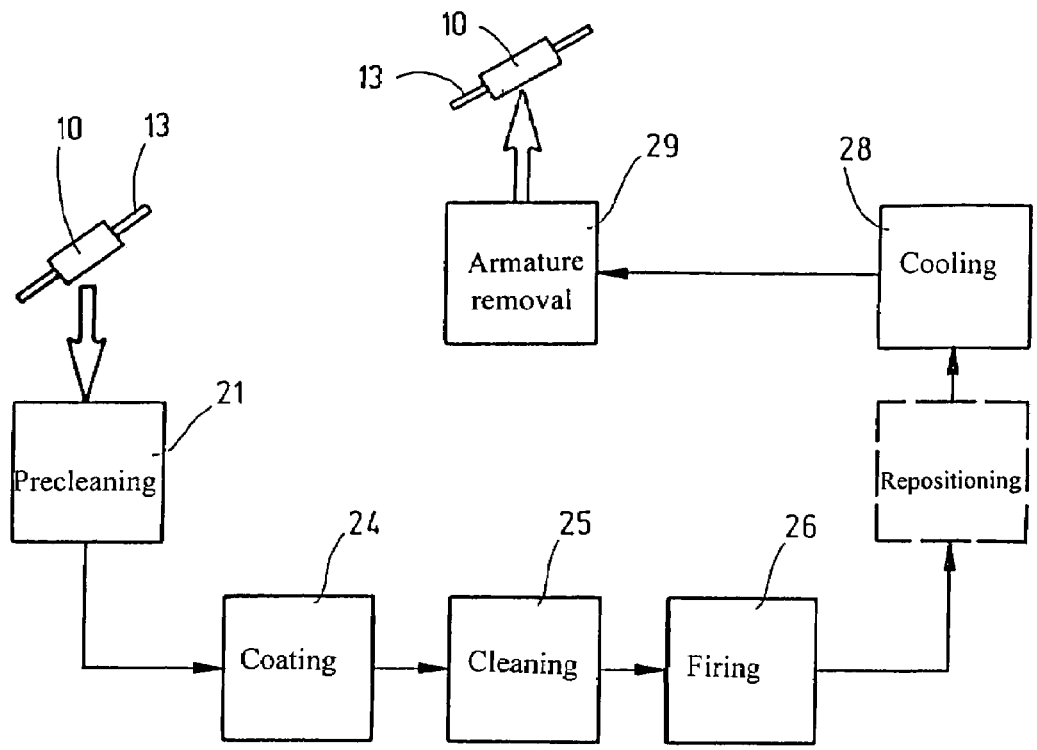
FIG. 3 is a flow chart of the method of the invention for coating armature bodies with insulation.
Figure 4:
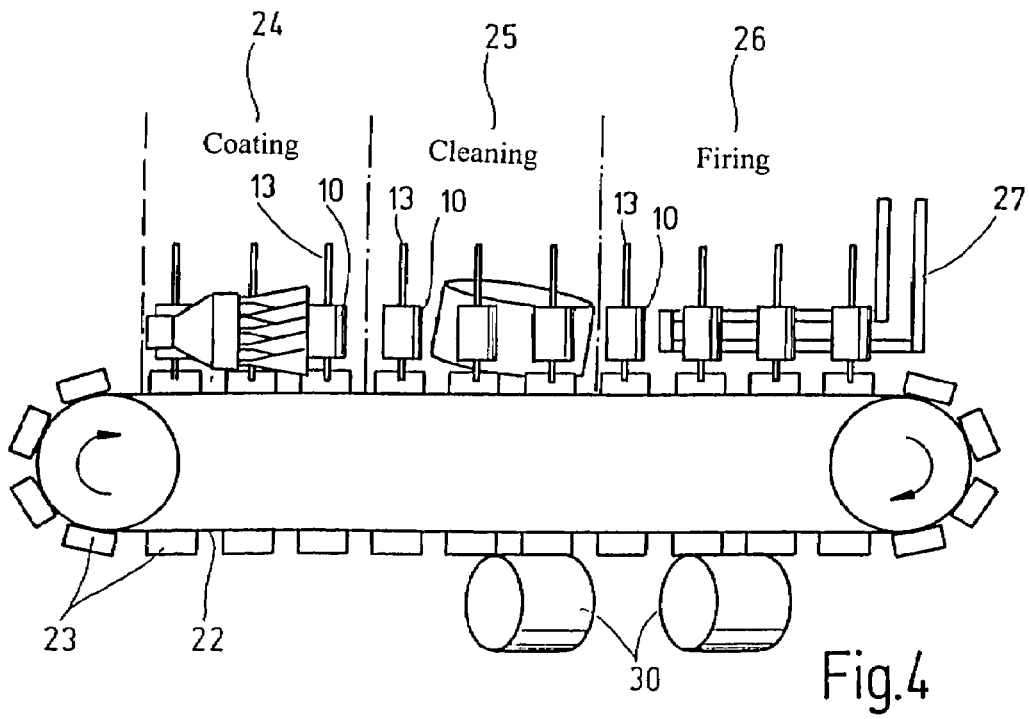
FIG. 4, a schematic illustration of a conveyor system for the passage of armature bodies through the coating process of the invention.

The armature bodies 10, pressed onto the armature shaft 13, are precleaned in a first method step, "precleaning", 21 (FIG. 3), in order to eliminate such manufacturing residues as trimmings from stamping and coolant residues. The precleaned armature bodies 10 are placed on a conveyor belt 22 with clamping devices 23 (FIG. 4) that fix the armature shaft 13 and are carried by the conveyor belt 22 through three method steps, "coating" 24, "cleaning" 25, and "firing" 26. In the "coating" method step 24, the armature bodies 10 are coated with electrostatically charged plastic powder. The coating is done with a layer thickness of approximately 1 to 2 mm, preferably approximately 1.0 to 1.5 mm—which includes production-dictated deviations—by direct powder spraying onto the preferably grounded armature body 10. It suffices if the armature body 10 has a lower electrical potential than the plastic powder; this is most simply attained, naturally, by grounding. However, it is also possible for the armature body 10 to have a higher potential. What is essential is that the armature body 10 have a potential difference, compared to the electrostatically charged plastic powder, such that the plastic powder reaches the armature body 10.

In the "cleaning" method step 25, the cylindrical surface of the coated armature bodies 10 is freed of the powder layer adhering to it, and in the "firing" method step 26, the coated armature bodies 10 are exposed to a heat input, as a result of which the powder layer applied to each armature body 10 melts and hardens. The layer thickness drops in this process to approximately one-third of the powder layer originally sprayed on. After that, the armature bodies 10 are removed from the conveyor belt 22 by means of a repositioning tool 27 (FIG. 4) and are cooled down in the "cooling" method step 28. Finally, the armature bodies 10, provided with the insulation, are removed from the method cycle in the "armature removal" method step 29 and delivered for instance to an automatic winder. In the return segment of the conveyor belt 22, the clamping devices 23 of the conveyor belt 22 are cleaned of powder residues by means of cleaning brushes 30.

Figure 5:
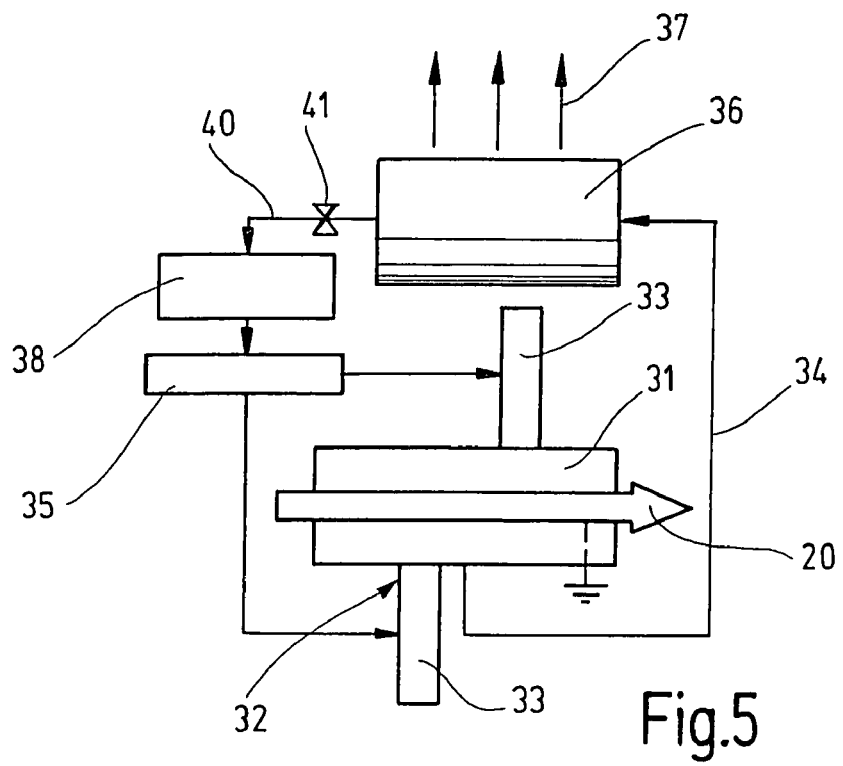
FIG. 5, a block circuit diagram of a system for electrostatic powder spray-coating suitable for use in the method of the invention.

In FIG. 5, the components required for performing the "coating" method step 24 are shown in a block circuit diagram. The spraying of the electrostatically charged plastic powder onto the grounded armature bodies 10 is done in a closed spraying chamber 31, through which the conveyor belt 22 passes with its upper, delivery section. The flow of parts, that is, the passage of the armature bodies 10 through the chamber 31, is represented by the arrow 20. The grounding of the armature bodies 10 is effected via the conveyor belt 22, which has clamping devices 23 and is in turn grounded. A spray apparatus 32 is integrated with the chamber 31 and via at least one spray location 33, by means of compressed air, sprays a metered quantity of powder onto each armature body 10. To that end, a so-called spray gun or corona gun is disposed at each spray location 33, and its spraying direction is aimed at the particular armature body 10 moving past it. Such spray guns are available on the market as standard components and are used for instance in painting decorative surfaces. The spray guns are connected to a voltage potential of approximately 70 kV for the sake of electrically charging the powder particles. The quantity of powder sprayed per armature body 10 is metered such that a layer thickness of preferably 1.0 to 1.5 mm is created on the armature body 10. A coarse plastic powder is used, whose powder particles have a mean diameter of more than 150 µm. These heavy powder particles improve the overcoming of the Faraday effect mentioned above and lead to an improved, uniform coating of the slot walls of the axial slots 14 in the armature body 10. Powder that does not reach the armature bodies 10 is delivered, via a so-called "overspray" line 34, to a powder bin 36, in which the compressed air laden with powder particles is passed through filters and flows out into the environment as waste air (arrow 37). The powder particles trapped by the filters drop back into a powder supply stored in the powder bin 36.

The quantity of powder delivered to the spray guns is made available by a metering device 35, which in turn is supplied with powder from the powder bin 36 by means of a pneumatic powder conveyor 38. The powder conveyor 38 is connected to the powder bin 36 via a suction line 40 that is controllable by a valve 41, and in the suction line 40 it generates an underpressure, by which when the valve 41 is open powder is aspirated from the powder bin 36; this powder is delivered with compressed air to the metering device 35.

Figure 6:
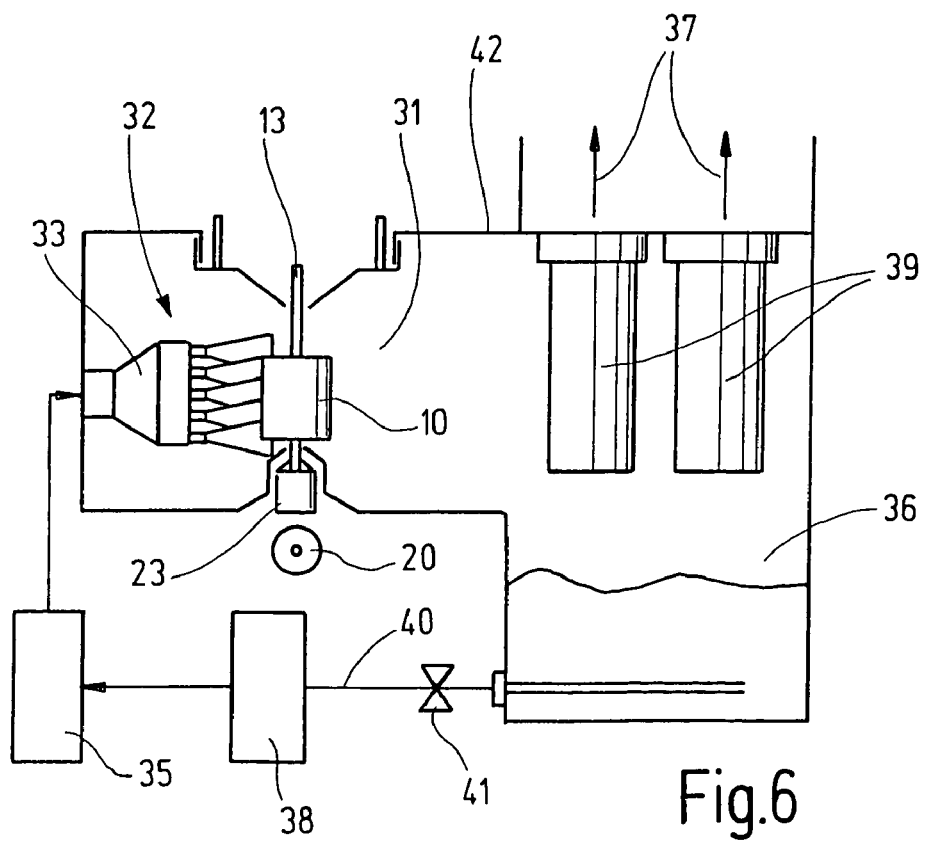
FIG. 6, a schematic illustration of a powder coating chamber with an integrated powder supply.

FIG. 6 schematically shows the combination of the spraying chamber 31 with the powder bin 36 in a common housing 42, as a compact integrated version of a coating chamber. The powder-laden air stream originating at the spray location s 33 or spray guns is carried, after flowing past the armature bodies 10, directly into the powder bin 36, in which the air can pass via filters 39 as waste air (arrow 37) into the environment. The powder residues deposited on the filter 39 drop onto the powder supply stored in a recessed bottom of the powder bin 36. From there, powder is aspirated by the pneumatic powder conveyor 38 and returned to the spray locations 33 via the metering device 35. For the sake of simplicity, in FIG. 4 only two spray locations 33 and in FIG. 5 only one spray location 33 are shown. The number of spray locations 33 in the spray apparatus 32, however, is arbitrary and is adapted to the desired throughput speed of the armature bodies 10 through the chamber 31.

The foregoing relates to a preferred exemplary embodiment of the invention, it being understood that other variants and embodiments thereof are possible within the spirit and scope of the invention, the latter being defined by the appended claims.

The invention claimed is:

1. A method for applying an electrical insulation to a ferromagnetic body of a primary element of an electrical machine, which ferromagnetic body is provided with axial slots for receiving an electrical winding, which axial slots form a Faraday cage whose field-free space can be coated during corona electrostatic spraying, in which the body is coated with electrostatically charged plastic powder, the method comprising applying a powder coating having a layer thickness of between 1.0 and 2.0 mm by means of direct powder spraying onto the body while maintaining a potential difference between the body and the powder, and further characterized in that for the powder spraying, a coarse plastic powder is used, whose powder particles have a mean diameter greater than 150 μm, as a result of which sufficient particles penetrate into the axial slots in order to create a layer, including within the axial slots, of between 1.0 and 2.0 mm.

2. The method as defined by claim 1, wherein the coating is done on the body while it has a lower potential than the plastic powder.

3. The method as defined by claim 1, wherein the powder spraying is performed with compressed air.

4. The method as defined by claim 2, wherein the powder spraying is performed with compressed air.

5. The method as defined by claim 1, wherein the powder spraying is performed in a closed spraying chamber with an electrostatic spray apparatus which is equipped with at least one spray location aimed at the body.

6. The method as defined by claim 2, wherein the powder spraying is performed in a closed spraying chamber with an electrostatic spray apparatus which is equipped with at least one spray location aimed at the body.

7. The method as defined by claim 3, wherein the powder spraying is performed in a closed spraying chamber with an electrostatic spray apparatus which is equipped with at least one spray location aimed at the body.

8. The method as defined by claim 5, further comprising the steps of removing the plastic powder from a powder supply by means of suction, and delivering a metered quantity of powder to the spray apparatus by means of compressed air.

9. The method as defined by claim 1, further comprising the step of subjecting the body to a cleaning process after the electrostatic powder spray-coating for removal of powder adhering to surfaces of the body where a coating of the powder is not wanted.

10. The method as defined by claim 2, further comprising the step of subjecting the body to a cleaning process after the electrostatic powder spray-coating for removal of powder adhering to surfaces of the body where a coating of the powder is not wanted.

11. The method as defined by claim 5, further comprising the step of subjecting the body to a cleaning process after the electrostatic powder spray-coating for removal of powder adhering to surfaces of the body where a coating of the powder is not wanted.

12. The method as defined by claim 8, further comprising the step of subjecting the body to a cleaning process after the electrostatic powder spray-coating for removal of powder adhering to surfaces of the body where a coating of the powder is not wanted.

13. The method as defined by claim 9, wherein the coated and cleaned body is subjected to a heating process that causes the firing of the powder coating.

14. The method as defined by claim 13, further comprising the steps of cooling the body after the heating process.

15. A method for applying an electrical insulation to a ferromagnetic body provided with axial slots for receiving an electrical winding, which axial slots form a Faraday cage whose field-free space can be coated during corona electrostatic spraying, in which the body, including within the axial slots, is coated with electrostatically charged plastic powder, the method comprising applying a powder coating having a layer thickness of between 1.0 and 2.0 mm within the axial slots by means of direct powder spraying onto the body, including within the axial slots, while maintaining a potential difference between the body and the powder, and further characterized in that for the powder spraying, a coarse plastic powder is used, whose powder particles have a mean diameter greater than 150 μm, so that sufficient particles penetrate into the axial slots in order to create a layer, including within the axial slots, of between 1.0 and 2.0 mm.

\* \* \* \* \*